UNITED STATES PATENT OFFICE.

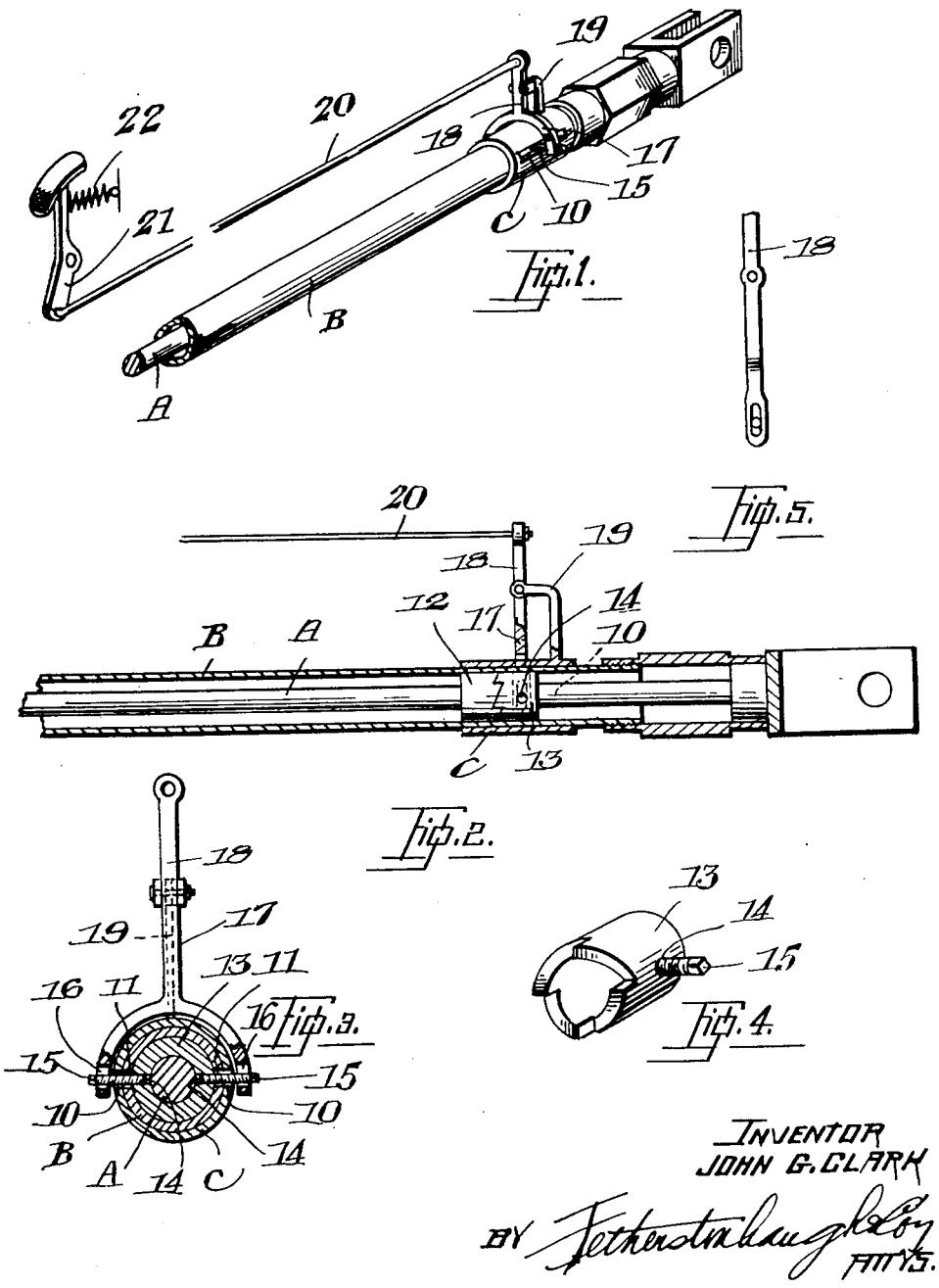

JOHN GEORGE CLARK, OF PAISLEY, ONTARIO, CANADA.

SAFETY-STOP FOR MOTOR-VEHICLES.

1,396,356.    Specification of Letters Patent.    Patented Nov. 8, 1921.

Application filed August 6, 1920. Serial No. 401,714.

*To all whom it may concern:*

Be it known that I, JOHN GEORGE CLARK, a subject of the King of Great Britain, a resident of the village of Paisley, county of Bruce, Province of Ontario, Dominion of Canada, have invented certain new and useful Improvements in Safety-Stops for Motor-Vehicles, of which the following is a specification.

This invention relates to improvements in safety stops for motor vehicles, and the objects of the invention are to prevent a motor vehicle running backward down a hill in the event of the power being inadequate for the vehicle to take a hill or in the event of any failure of any of the working parts, to permit of the stop being quickly applied and automatically released, to simplify the arrangement of the stop and permit of it being utilized on motor vehicles, at present in use and generally to adapt the several parts to better perform the functions required of them.

With the above and other objects in view, the invention consists essentially of the improved construction and arrangement of parts, particularly described and set forth in the following specification and accompanying drawings forming part of the same.

In the drawings:

Figure 1 is a perspective view of a part of a transmission shaft of a motor vehicle with my improved stop thereon.

Fig. 2 is a longitudinal section of the shaft casing showing the shaft in elevation and the stop mounted thereon.

Fig. 3 is a transverse section through the shaft casing and shaft and showing the improved stop.

Fig. 4 is a perspective view of one portion of the stop member which is in the form of a four-point clutch.

Fig. 5 is a side elevation of one of the arms of the lever which operates the clutch.

Like characters of reference refer to like parts in the several figures.

Referring to the drawings; A represents a portion of a transmission shaft of a motor vehicle, and B the casing therefor.

On this casing a sleeve C is mounted which reinforces the casing and the sleeve is provided with elongated orifices 10 located diametrically opposite each other and which register with similar elongated orifices 11 in the casing B.

On the shaft A, a clutch member 12 is rigidly mounted, and loosely mounted on the shaft A is a second clutch member 13 which may be moved longitudinally into engagement with the first clutch member as will be hereinafter explained.

The clutch member 13 is provided with orifices 14 located diametrically opposite each other and with these orifices pins 15 make threaded or like engagement. The pins 15 pass through elongated orifices 16 in the arms 17 of a lever 18 which is pivotally mounted to the bracket 19 carried by the sleeve C.

This lever 18 is connected by a rod 20 to a foot lever 21 which is pivoted on the vehicle and located convenient to the driver's foot. The foot lever 21 is returned to a normal position by a spring 22.

When a motor vehicle equipped with my improved safety stop is in use, and if taking a hill it is found necessary to stop, then the driver applies a force to the foot lever 21 rotating the same about its pivotal point and transmitting a pull to the rod 20, which throws the clutch member 13 into engagement with the fixed clutch member 12.

If the motor vehicle starts to back down the hill, the rotation of the shaft A would be arrested by the clutch member 13 which would be rotated and cause the pins 15 to engage with the walls of the elongated orifices 10 and 11, so stopping the rotation of the clutch member and of the said shaft.

As soon as the power was applied to the motor vehicle to drive it forwardly, the driver would release the foot lever 21 and the spring 22 would act on the said foot lever to return it to its normal position and so transmit motion to the rod 20 and lever 18, thereby disengaging the clutch 13 automatically from the clutch 12.

This device may be used in hill climbing to take a hill in a step by step action, that is to say, the stop member would be brought into operation each time the power was shut off and automatically released each time the power was applied to the shaft A.

By providing a plurality of points upon the clutch members 12 and 13, then the backward movement of the motor vehicle could be limited to a very small part of a rotation of the said wheel.

In this way, the utility and safety of the stop is greatly increased.

As many changes could be made in the above construction and many widely different embodiments of my invention within the scope of the claims constructed without departing from the spirit or scope thereof, it is intended that all matter contained in the accompanying specification and drawings shall be interpreted as illustrative and not in a limiting sense.

What I claim as my invention is:

1. In a motor vehicle and in combination with the transmission shaft thereof, a clutch member fixed to the shaft, a second clutch member loosely mounted in the shaft, means for moving the second clutch member into contact with the first clutch member, and means coacting with the second clutch member to prevent the rotation of the same and the said shaft when the two clutch members are in engagement.

2. In a motor vehicle, the combination claimed in claim 1, in which the second clutch member will be automatically released during the forward movement of the motor vehicle, as and for the purpose specified.

3. In a motor vehicle, the combination claimed in claim 1, in which the movable clutch member is controlled by a lever designed to be actuated manually.

4. The combination claimed in claim 1, in which a shaft casing is provided, a sleeve on the shaft casing, registering orifices in the shaft casing and sleeve, pins extending through the orifices into the movable portion of the clutch, and a lever connected to the said pins, and designed to be manually moved in one direction and automatically moved in the opposite direction.

In witness whereof I have hereunto set my hand in the presence of two witnesses.

JOHN GEORGE CLARK.

Witnesses:
 MARY E. KNOX,
 CLARICE FERGUSON.